United States Patent
Frantz et al.

(10) Patent No.: US 9,951,651 B2
(45) Date of Patent: Apr. 24, 2018

(54) BEARING WITH LUBRICATION MEANS AND SYSTEM FOR CHANGING THE PITCH OF THE BLADES OF A TURBOPROP PROPELLER OF AN AIRCRAFT EQUIPPED WITH SAID BEARING

(71) Applicant: SNECMA, Paris (FR)

(72) Inventors: Caroline Frantz, Maisons-Alfort (FR); Dominik Igel, Hericy (FR); Nadege Hugon, Montgeron (FR); Augustin Curlier, Melun (FR)

(73) Assignee: SNECMA, Paris (FR)

( * ) Notice: Subject to any disclaimer, the term of this patent is extended or adjusted under 35 U.S.C. 154(b) by 546 days.

(21) Appl. No.: 14/405,240

(22) PCT Filed: Jun. 27, 2013

(86) PCT No.: PCT/FR2013/051502
§ 371 (c)(1),
(2) Date: Dec. 3, 2014

(87) PCT Pub. No.: WO2014/001723
PCT Pub. Date: Jan. 3, 2014

(65) Prior Publication Data
US 2015/0147178 A1 May 28, 2015

(30) Foreign Application Priority Data
Jun. 27, 2012 (FR) .................................... 12 56140

(51) Int. Cl.
*F01D 25/18* (2006.01)
*F16C 33/66* (2006.01)
(Continued)

(52) U.S. Cl.
CPC ............ *F01D 25/18* (2013.01); *B64C 11/306* (2013.01); *F01D 17/16* (2013.01); *F16C 29/04* (2013.01);
(Continued)

(58) Field of Classification Search
CPC ... F01D 7/00; F01D 7/02; F04D 29/06; B64C 11/30; B64C 11/38; B64C 11/306;
(Continued)

(56) References Cited

U.S. PATENT DOCUMENTS 1,556,460 A * 10/1925 Thill ......................... F16F 1/24
184/42
5,022,821 A * 6/1991 Isert ...................... F04D 29/362
416/157 R
(Continued)

FOREIGN PATENT DOCUMENTS

EP  0 361 982 A2  4/1990
WO  WO 2009/000268 A2  12/2008

OTHER PUBLICATIONS

International Search Report dated Oct. 14, 2013, in PCT/FR13/051502 filed Jun. 27, 2013.

*Primary Examiner* — Kenneth Bomberg
*Assistant Examiner* — Hoon Choi
(74) *Attorney, Agent, or Firm* — Oblon, McClelland, Maier & Neustadt, L.L.P.

(57) ABSTRACT

A bearing, such as a rolling bearing, is mounted on a support mobile in translation and includes a lubrication mechanism. The lubrication mechanism includes at least one pipe delivering a lubricant, linked to a lubricant supply source, and at least partially engaging in the support mobile in translation to deliver the lubricant from the mobile support along an internal channel to the bearing, passing through an inner ring of the bearing.

8 Claims, 3 Drawing Sheets

(51) Int. Cl.
*B64C 11/30* (2006.01)
*F01D 17/16* (2006.01)
*F16C 29/04* (2006.01)
B64D 27/00 (2006.01)
F16C 23/06 (2006.01)

(52) U.S. Cl.
CPC ...... *F16C 33/6659* (2013.01); *F16C 33/6677* (2013.01); *B64D 2027/005* (2013.01); *F16C 23/06* (2013.01); *F16C 2326/43* (2013.01); *F16C 2360/23* (2013.01); *Y02T 50/66* (2013.01)

(58) Field of Classification Search
CPC .. F16C 33/1005; F16C 33/1025; F16C 33/66; F16C 33/6637
USPC .................................................. 384/311, 322
See application file for complete search history.

(56) References Cited

U.S. PATENT DOCUMENTS

| | | |
|---|---|---|
| 5,122,034 A | 6/1992 | Isert |
| 2010/0179011 A1 | 7/2010 | Demtroeder et al. |

* cited by examiner

BEARING WITH LUBRICATION MEANS AND SYSTEM FOR CHANGING THE PITCH OF THE BLADES OF A TURBOPROP PROPELLER OF AN AIRCRAFT EQUIPPED WITH SAID BEARING

BACKGROUND OF THE INVENTION

Field of the Invention

The present invention relates to a bearing having improved lubrication means, to a system for changing the pitch of the vanes of an aircraft turboprop engine propeller, equipped with said bearing having improved lubrication means, and to a turboprop engine equipped with such a system.

In general terms, the bearing according to the invention is intended to be mounted on a support able to move in translation which, in the preferred though not exclusive application described below, may be a linear actuator forming part of a system for orienting the vanes of a propeller.

Such an orientation system is in particular mounted in turboprop engines having a pair of contrarotatory propulsion propellers, referred to as "open rotor" or "unducted fan", but could also, without departing from the scope of the invention, be mounted on a turboprop engine having one propulsion propeller.

Description of the Related Art

It is known that a turboprop engine of the open rotor type comprises mainly, along a longitudinal axis and inside a fixed cylindrical nacelle carried by the aircraft structure (such as the rear part of the fuselage of an aeroplane), a "gas generator" part and, behind or in front of said gas generator part, a "propulsion" part. Said propulsion part comprises two coaxial and contrarotatory propellers, upstream (front) and downstream (rear) respectively, which are driven, in opposite rotations to each other, for example, by an epicyclic reducer driven by a low-pressure turbine of the gas generator part, and in which the vanes of the propellers extend substantially radially outside the nacelle.

Each propeller conventionally comprises a hub having an external polygonal ring (rotor), received so as to rotate in the fixed nacelle and having radial cylindrical compartments distributed at its periphery around the longitudinal axis of the turboprop engine. The roots of the vanes are received in the compartments in each ring.

To afford optimum operation of the turboprop engine in the various flight phases encountered, the vanes of the contrarotatory propellers can rotate in the radial compartments of the rings. For this purpose, they are set into rotation about their respective pivot axes, by a suitable system for varying the setting of the vanes during flight, that is to say the pitch of the propellers.

Various solutions have been proposed for changing the pitch of the vanes of the propellers on open rotor turboshaft engines or the like.

The system disclosed by FR 2 908 451, disadvantaged however by problems of oversizing, mass and impermeability and, recently, the system described in the French patent application of the applicant FR 11 58891, are known.

This system for orienting the vanes of a propeller comprises:

- a linear-movement actuator centred on the longitudinal axis of the turboprop engine and rigidly connected to a fixed casing supporting the propeller;
- a connection mechanism for transforming the translation of the movable part of the actuator into a rotation of the vanes in order to modify the pitch thereof, and comprising a transfer bearing, the inner ring of which is rigidly connected to the movable part of the actuator, and a means of transmission between the outer ring of the bearing and the vanes, and
- a means for lubricating said transfer bearing.

Thus, by means of a single annular actuator in this example with linear movement fixed to a fixed casing or stator, and by means of a connection mechanism having a transfer bearing and transmission means, the system makes it possible to change a translation of the actuator into a rotation of the vanes, with great reliability of operation, reduced mass and space requirements, and guaranteed fluid-tightness, since the actuator (its fixed part) is rigidly connected to the fixed casing of the turbine engine, supporting the rotor of the propeller.

Although such a system for orienting vanes gives satisfactory results, from both the structural and the functional points of view, reservations have nevertheless arisen with regard to the lubrication of the transfer bearing, which is subjected to high thermal and mechanical stresses.

In a known solution, the lubrication means is composed of nozzles located respectively on the two transverse sides upstream and downstream of the bearing, and supplied by a lubrication source. Thus the jets issuing from the nozzles lubricate the bearing. However, when the bearing is moved in translation with the movable part of the actuator, it is located closer to one of the nozzles and, more importantly, further away from the other, such that the efficacy of the further-away jet is less.

In addition, the lubrication of a bearing, such as a rolling bearing having one or more rows of balls or rollers, through its transverse faces, is not optimum and requires precise targeting according in particular to the shape of the inner ring, the cage and the outer ring of the bearing.

Furthermore, the lubrication means is difficult to integrate around the actuator because of the limited environment, which is very constraining (on the upstream side, limited space and power transmission blocks close by; on the downstream side, no possibility of supply).

Another lubrication-means solution consists in providing calibrated constant leaks between the chambers of the actuator, that is to say the movable and fixed parts thereof, and the propulsion enclosure containing the bearing and the transmission means. Such a solution has consequences on the sizing of the hydraulic pitch-control system that supplies the actuator directly, as well as on the operation (increase in size of the pump, leaks to be taken into account in the performances and operability of the system).

In addition, as the pressure in the chambers of the actuator varies, the leaks are unequal during operation. The transfer bearing is moreover always lubricated through the transverse sides, as before with the drawbacks that result therefrom. Finally, because of the centrifugal effect, it is difficult to properly maintain the leakage flow rate of the actuator towards the inner ring of the bearing.

Thus, in general terms, the lubrication of a bearing mounted on a support able to move in translation (in the above application, an actuator or the like) poses problems.

BRIEF SUMMARY OF THE INVENTION

The aim of the present invention is to remedy these, and said invention relates to a bearing mounted on a movable support, in which the design of the lubrication means guarantees in particular optimum lubrication of said bearing without taking up the space and, in the above application, independent of the supply system of the actuator.

For this purpose, the bearing, such as a rolling bearing, mounted on a support able to move in translation and comprising a lubrication means, the support able to move in translation being defined by the movable part sliding about the fixed piston of a linear-movement actuator, around which the inner ring of the bearing to be lubricated is mounted, the means for lubricating the bearing comprising at least one pipe for conveying a lubricant, connected to a lubricant supply source, and a conduit connected to the movable support, in which engages, at least in part, the pipe for conveying the lubricant on an internal path from said movable support to the bearing, passing through the inner ring thereof, said bearing being notable, according to the invention, in that said pipe and said conduit extend parallel to the translational movement of the movable support in order to cooperate with each other by sliding between the two extreme positions of the support, said pipe being fixed and the conduit sliding with respect thereto.

Thus, by means of the invention, the lubrication means is mainly integrated in the movable support, inside same, to supply the bearing with lubricant directly through its inner ring, affording optimum and homogeneous lubrication thereof, as opposed to random and unequal lubrication from outside, through the transverse sides of the bearing. In addition, such a lubrication means by pipe and integrated internal path does not take up space in the external environment.

In the aforementioned application, the lubrication means is independent of the system supplying the actuator and the drawbacks that this causes, and in addition dispenses with extra nozzles and other related accessories external to the actuator that are difficult to install due to the lack of space.

In addition, the lubricant issuing from the pipe circulates entirely, through the conduit of the internal path, in the lateral wall of the support (the movable part of the actuator) until it comes to lubricate the inside of the bearing, whereas the support can slide with respect to the fixed pipe (and therefore to the fixed part of the actuator). The simplicity of producing the lubrication means will also be noted.

According to one embodiment, the conduit is provided in a lateral wall of the support able to move in translation and wherein the internal path comprises at least one hole made in the inner ring of the bearing and in communication with the conduit.

In order to optimise the lubrication of the bearing as much as possible, a plurality of pipes can be distributed angularly with respect to one another and communicating, on the upstream side, with a common element for conveying the lubricant connected to the supply source, and can engage, on the downstream side, in respective conduits provided so as to correspond in the wall of the movable support.

Moreover, when the support is the movable part of a linear actuator dedicated in particular to application to a pitch-control system, the movable part and the fixed part of the linear actuator are interconnected in rotation by means of at least one connecting tube supported by the transverse end faces of the movable part and associated with the fixed part. Advantageously, in this other embodiment of the lubrication means, the internal passage of said tube forming the conduit is able to receive the pipe conveying the lubricant, forming the internal path.

Thus use is made of the anti-rotation tube (or tubes) provided on the linear actuator to allow the pipe (or pipes) conveying the lubricant to be introduced therein.

In this case, the internal path of the lubrication means comprises two portions, a first portion for conveying the lubricant through the internal passage of the tube in the movable part of the actuator, and a second portion connected to the first portion to convey the lubricant from the internal passage to the transfer bearing.

In particular, the second portion can be defined by orifices formed so as to correspond in the tube and the relevant transverse face of the movable part, and by an annular chamber formed between the lateral wall of the movable part and a sleeve for annular support of the inner ring of the bearing, and communicating with said orifices and the ring.

The invention also relates to a system for changing the pitch of the vanes of a turboshaft engine propeller having a longitudinal axis for an aircraft, comprising:
   a linear-movement actuator centred on the axis and rigidly connected to a fixed casing supporting the propeller;
   a connection mechanism for transforming the translation of the movable part of the actuator into a rotation of the vanes in order to modify the pitch thereof, and comprising a transfer bearing, the inner ring of which is rigidly connected to the movable part of the actuator, and a means of transmission between the outer ring of the bearing and the vanes, and
   a means for lubricating said transfer bearing.

Advantageously, the means for lubricating the bearing is as defined above.

The invention also relates to a turbine engine having coaxial and contrarotatory propulsion propellers, upstream and downstream respectively.

Advantageously, at least the upstream propeller is equipped with a system for changing the pitch of the vanes as defined above.

BRIEF DESCRIPTION OF THE SEVERAL VIEWS OF THE DRAWINGS

The figures of the accompanying drawings will give a clear understanding of how the invention can be implemented, in particular in the application of the bearing to a system for orienting the pitch of a turboprop engine propeller.

DETAILED DESCRIPTION OF THE INVENTION

Figure 1:
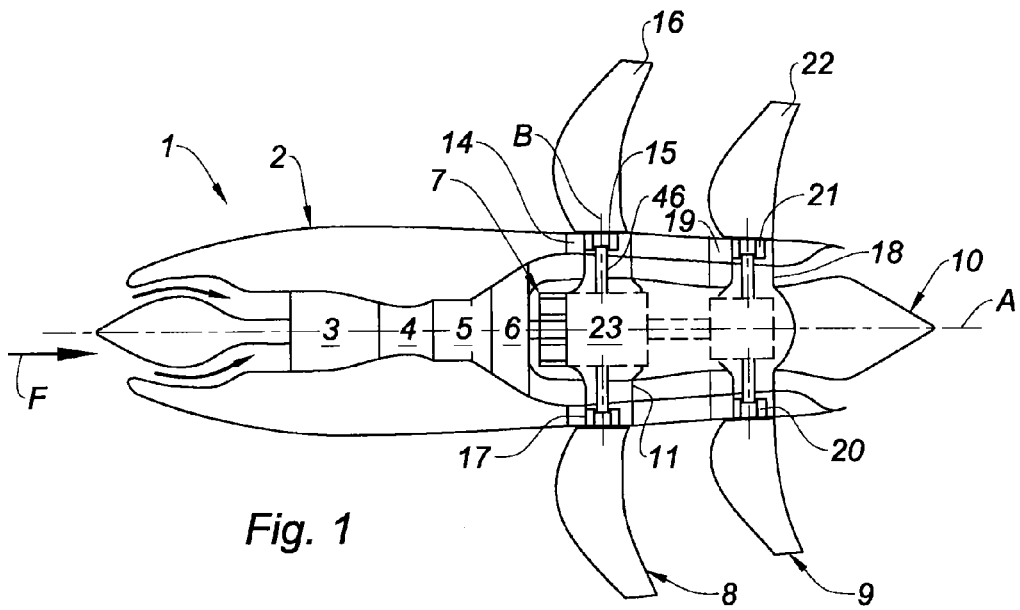
FIG. 1 is a schematic, axial sectional view of a turboprop engine having an unducted fan located downstream of the gas generator, incorporating a system for changing the pitch of the vanes in accordance with the invention for one of the propellers of the fan.

Reference is made first of all to FIG. 1, which depicts schematically a turboprop engine having an unducted fan 1

("open rotor" or "unducted fan") with a longitudinal axis A. This turboprop engine conventionally comprises, from upstream to downstream in the direction of flow of the gaseous flow F inside a nacelle 2 of the turboprop engine, one or two compressors 3 depending on the architecture of the single- or double-stage gas generator, an annular combustion chamber 4, a high-pressure turbine or two high-pressure and intermediate-pressure turbines 5 depending on said architecture, and a low-pressure free turbine 6 which, by means of a reducer or epicyclic train gearbox 7 and contrarotatively, drives two propellers which are upstream 8 and downstream 9 in the direction of the flow F and are aligned coaxially along the longitudinal axis A of the turboprop engine in order to form the fan. Without departing from the scope of the invention, the propellers 8 and 9 and the epicyclic train gearbox 7 could be located upstream of the gas generator, the assembly being connected to the low-pressure free turbine 6 by an internal shaft. An exhaust nozzle 10 terminates the turboprop engine.

The propellers are arranged in radial parallel planes, perpendicular to the axis A, and rotate by means of the low-pressure turbine 6 and the reducer 7 in opposite directions of rotation.

Figure 2:
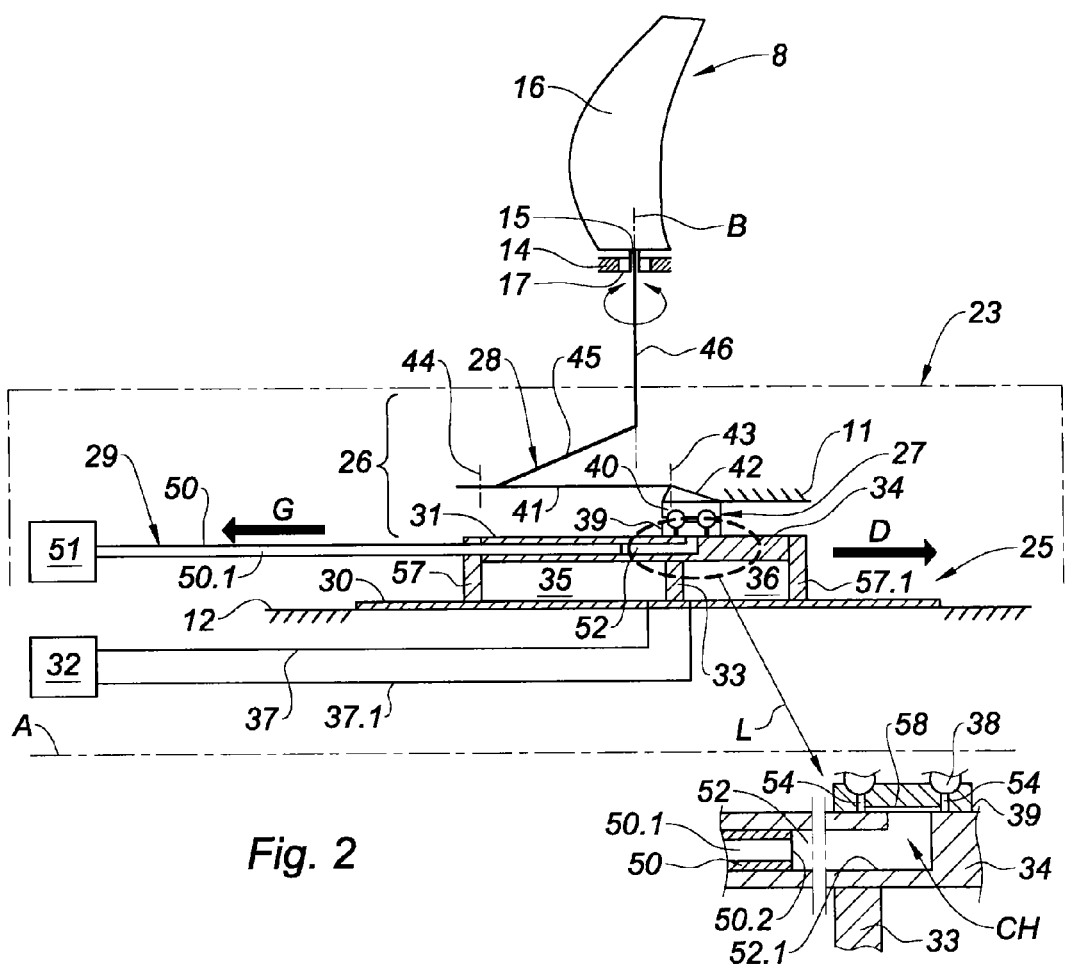
FIG. 2 is a schematic, axial half-sectional view of the system for changing the pitch of the vanes with a first embodiment of the means for lubricating the transfer bearing, passing through the movable part of the control actuator.

For this purpose, as shown by FIGS. 1 and 2, the upstream propeller 8 comprises a rotary cylindrical casing 11, which is connected in rotation to a corresponding part of the reducer in order to rotate in one direction, and is supported by rolling bearings (not shown) on a fixed cylindrical casing 12. The casing 11 terminates radially, on the side opposite the reducer 7, in a rotary hub having a polygonal ring 14 housed in a conventional manner in the nacelle 2 and receiving, in cylindrical compartments 17, the roots 15 of the vanes 16 of the propeller 8, said vanes thus projecting externally from the nacelle.

In a similar manner, the downstream propeller 9 comprises a rotary cylindrical casing 18, connected in rotation on one side to another part of the gearbox 7, in order then to rotate in the opposite direction. This rotary casing 18 is supported by rolling bearings on the fixed cylindrical casing 12 and terminates, on the other side, in a rotary hub having a polygonal ring 19 receiving, in a similar manner to previously, in compartments 20, the roots 21 of the vanes 22 of the propeller 9.

In operation, and briefly, the air flow F entering the turboshaft engine 1 is compressed, and then mixed with fuel and burnt in the combustion chamber 4. The combustion gases generated then pass into the turbines 5 and 6 in order to drive, in reverse rotation, via the epicyclic reducer 7, the propellers 8, 9, which supply the major part of the thrust.

The combustion gases are expelled through the exhaust nozzle 10 in order thus to increase the thrust of the turboprop engine 1.

Moreover, the vanes 16 and 22 of the upstream and downstream propellers are of the variable-setting type, that is to say they can be oriented about their radial pivot axes B by means of a system 23 for changing or orienting the pitch of the vanes, so that said vanes adopt an optimum angular position according to the operating conditions of the turboprop engine and the flight phases in question. In the present description, only the system 23 for orienting the vanes associated with the upstream propeller 8 will be described. The downstream propeller 9 can be equipped with a system for orienting the vanes that is similar to or different from that developed below in relation to the upstream propeller.

For this purpose, as shown by FIGS. 1 and 2, the system 23 for changing the pitch of the vanes (and therefore their setting) is provided in the internal space located between the fixed casing 12 or stator of the turboprop engine connected to the propeller 8 in question, and the rotary casing 11 or rotor connected to the hub of this same propeller in order to vary the angular position of the vanes and therefore the pitch of the propeller.

This system 23 is composed mainly of a linear-movement control actuator 23, a connection mechanism 26 having a transfer bearing 27 and transmission means 28, and a hub 29 for lubricating the transfer bearing. Thus the objective of the system is to transform the translation of the actuator into a rotation of the vanes.

In particular, the actuator 25 is annular since it is arranged around shafts (not shown) of the turboprop engine, and is coaxial with the longitudinal axis A of said engine. It comprises a cylindrical fixed part 30 surrounding in particular the fixed casing 12 while being rigidly connected thereto, with immobilisation in translation and rotation. Around the cylindrical fixed part 30 of the actuator 25 is the cylindrical movable part 31 serving as an external sliding rod of the actuator. This movable part or rod 31 can thus move axially by means of a controllable fluid supply source 32 of the actuator.

For this purpose, the fixed part comprises a (fixed) piston 33 along which the lateral wall 34 of the movable part 31 can slide sealingly, and which delimits two opposing variable-volume chambers 35, 36 opposite each other. These two chambers, which are moreover fluid-tight, are connected by supply/discharge pipes 37, 37.1, to the controllable fluid source 32, such as a hydraulic fluid. Thus, according to the supply pressure sent into the actuator by one of the pipes, the movable part or rod 31 can slide between two extreme positions defined by minimum and maximum fluid volumes in the two opposing chambers 35, 36.

Around the movable external rod 31 of the actuator there is mounted, as shown schematically in FIG. 2, the transfer bearing 27 of the connection mechanism 26, a bearing which, in this example, is a rolling bearing with a double row of balls 38. Thus the inner ring 39 of the rolling bearing is fixed around the rod 31 of the actuator while being connected thereto for conjoint translational movement. The rod or movable part 31 forms, in general terms, the support able to move in translation for the inner ring of the rolling bearing. The outer ring 40 of said rolling bearing, cooperating with the rotary casing 11, is connected to the transmission means 28 of the connection mechanism 26, in order to provide the angular rotation of the vanes.

For this purpose, the transmission means 28 comprises a plurality of connecting rods 41, identical in number to the vanes 16, and equiangularly distributed with respect to one another around the actuator, substantially vertically in line therewith. The connecting rods 41 are connected, by one of the ends thereof, to a rotary annular support 42 of the outer ring 40 of the rolling bearing, by means of articulation axes represented at 43 in FIG. 2, parallel to the axes B of the vanes. The other ends of the connecting rods 41 are connected, around articulation axes 44 parallel to the previous ones, to substantially transverse crankpins 45 provided at the ends of the rotary radial shafts 46 that extend the roots 15 of the vanes, along the axis B. The orientation of the vanes 16 of the propeller 8 with a change in the pitch from the actuator 25 and the connecting mechanism 26 of the system 23 is described in the aforementioned patent application.

The means 29 for lubricating the bearing 27 comprises, advantageously and in the embodiment in FIG. 2 (with its enlargement L) and 3, a plurality of pipes 50, the internal passage 50.1 of which is intended for conveying a lubricant. The pipes are, on one side, connected to a source 51 supplying lubricant (oil for example) and, on the other side, introduced into the movable part or cylindrical rod 31 of the actuator 25 in order to bring the lubricant, on an internal path CH, to the bearing 27. For this purpose, the internal path CH comprises conduits 52 for receiving the pipes 50, which are provided, parallel to the axis A, in the annular lateral wall 34 of the rod, and holes 54 made radially in the inner ring 39 of the bearing in order to convey the lubricant inside said bearing.

The term "pipe" is to be taken in the broadest sense and denotes any type of conduit, tube, pipework or the like inside which a liquid or gaseous fluid can circulate.

In this example, there are six pipes 50 which are regularly distributed angularly with respect to one another about the longitudinal axis A. These pipes are substantially parallel to this axis and the number thereof could be different without departing from the scope of the invention; the main thing is to ensure, homogeneously and regularly, the proper lubrication of the transfer bearing.

Figure 3:
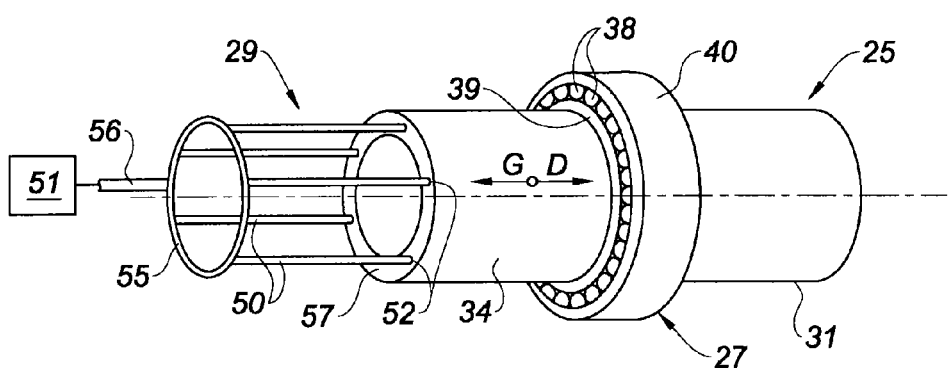
FIG. 3 is a perspective view of the set of pipes of the lubrication means introduced into the movable part of the control actuator of the system.

As can be seen in FIG. 3, the pipes 50 are, on one side, interconnected by a common connection element 55, in this example in the form of a ring, arranged radially and provided with a connection 56 to the source 51 supplying lubricant. This is moreover advantageously independent of the fluid supply source 32 of the actuator 25. On the other side, the ends 50.2 of the pipes 50 are free and thus engage in the lateral reception conduits 52 provided so as to correspond in the lateral wall 34 of the movable annular rod 31, parallel to the action of the actuator (along the axis A of the turboprop engine).

This set of pipes 50 issuing from the source 51 is axially fixed, connected to the static casing 12, and its arrangement is determined so that the free ends 50.2 of the pipes 50 remain inside the conduits 52 of the movable rod 31 when said rod is located in the furthermost extreme position, that is to say towards the right (arrow D) in FIG. 2, under the effect of the hydraulic pressure in the chamber 36 issuing from the source 32. Conversely, when the movable rod 31 occupies the other extreme position furthest to the left (arrow G), the pipes 50 are almost fully engaged in the conduits 52. To avoid leaks, sealing by O-ring seals or the like could be envisaged between the free ends 50.2 of the pipes and the internal surface 52.1 of the conduits 52 conveying oil. A description thereof will be given in FIG. 5, with regard to the other embodiment of the lubrication means.

Each pipe is produced from a suitable material (metal, composite or other), preferably rigid or semi-rigid, with the objective of remaining in place in the conduits.

More particularly, each lateral conduit 52 of the movable rod 31 opens, on one side, from the corresponding transverse face 57 thereof and, on the other side, into the external lateral wall 34 of the rod, vertically in line with the inner ring 39 of the bearing. The conduit 52 is therefore for the most part rectilinear, and then angled radially in order to open into the lateral wall.

As shown by FIG. 2 and its enlargement L, in the inner ring 39 there is provided an annular counterbore 58 into which open the conduit 52 and the holes 54 radially pierced in the inner ring level with the rows of balls 38.

Thus optimum homogeneous and constant lubrication of the bearing 7 is obtained at several points directly from the inside of the bearing towards the balls, whatever the position of the movable rod 31 with respect to the fixed part 30 having piston 33 of the linear actuator 25, since the inner ring is rigidly connected to the movable rod. The lubricant coming from the source 51 circulates in the passages 50.1 of the pipes 50 and then in the path CH (conduits 52 and holes 54) in order to reach the inside of the bearing.

In a variant, it would be possible to envisage, as the internal path, a single fixed pipe 50 issuing from the source 51 and engaged in a conduit leading to an annular groove (not shown) provided around the lateral wall 53 of the rod, this groove (instead of the counterbore) communicating directly with at least the radial hole 54 of the inner ring. This radial hole or holes may be provided between the two rows of connecting rods of the rolling bearing or, as before, communicate with the rolling tracks of the balls, optimum lubrication of the rolling bearing being in any event guaranteed.

Figure 4:
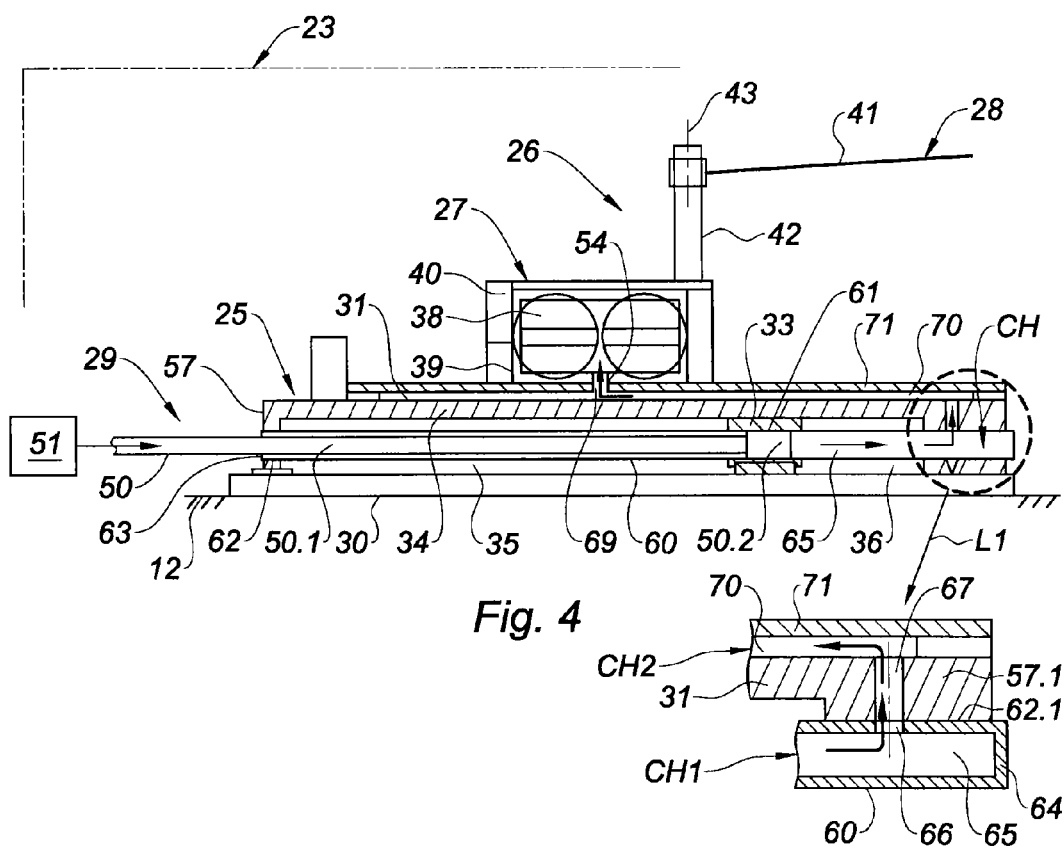
FIG. 4 is a partial, axial half-sectional view of the system for changing the pitch with a second embodiment of the means for lubricating said bearing, passing through connection tubes of the actuator.
Figure 5:
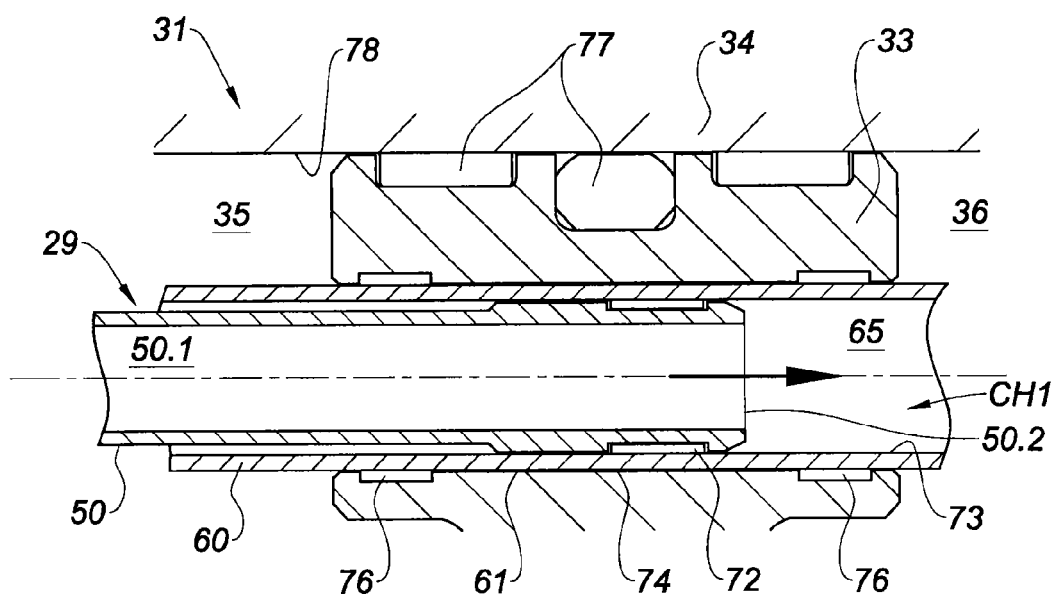
FIG. 5 is an enlargement of the depicted pipe of the lubrication means and of the connection tube of the movable part of the actuator.

Moreover, as shown by FIG. 4, with a view to preventing the rotation of the movable part or sliding rod 31 of the linear annular actuator 25 with respect to its fixed part 30 having piston 33, at least one axial tube (or hollow rod) 60 is arranged between the two parts 30, 31 in order to pass through them and immobilise them in rotation with respect to each other, while maintaining sliding between them. In reality, a plurality of connection tubes 60 are distributed around the two fixed 30 and movable 31 parts of the actuator and only one of them is depicted in FIGS. 4 and 5 showing another embodiment of the lubrication means, the other connection tubes being structurally and functionally identical.

The lubrication means 29, in this other embodiment, advantageously uses at least one of the anti-rotation connection tubes 60 in place of the conduits 52.

Structurally, each tube is arranged parallel to the axis A of the actuator 25 and is carried at its ends by the transverse end faces 57, 57.1 of the movable rod 31 of the actuator and, in this embodiment, passes through the chambers 35, 36 of the actuator and the piston 33 through a hole 61 made therein. The ends of the tube depicted at 60 are received in the transverse faces of the movable rod of the actuator by means, there also, of holes 62, 62.1 made therein. These tubes are axially fixed with respect to this movable part and, although it is not shown, a seal is provided between its transverse faces and the anti-rotation connection tube.

The end 63 of the tube 60 turned towards the pipe 50 is then open for engagement thereof in the internal passage 65 of the connection tube, while its other end 64, at the other transverse face 57.1, is closed.

On the other hand, the seal between the pipe 50, the tube 60, the piston 33 and the movable rod 31 of the actuator is shown in detail with regard to FIG. 5.

Prior to the description thereof, it should be noted that, in the anti-rotation connection tube 60, there is partially introduced the fixed pipe 50 issuing from the lubrication fluid source 51. The engagement of this pipe is, there also, such that it is always in the guide tube in the position adopted by the movable rod 31 of the actuator 25 in order to control the orientation of the vanes.

In order to convey the lubrication oil as far as the bearing, the internal path CH then comprises a first portion CH1 for driving the oil, issuing from the passage 50.1 of the pipe 50, as far as the sliding movable part 31 of the actuator, corresponding to the internal passage 65 of the tube, and a second portion CH2 for driving the oil from the sliding movable part 31 into the rolling bearing 27. This is because, unlike the previous example where the path CH (conduits 52) is integrated or produced in the rod of the actuator itself, communicating directly with the inner ring 39, in this other example, it is necessary to envisage the path CH partially outside the actuator in order to be able to lubricate the rolling bearing from its inner ring.

For this purpose, as shown by the enlargement L1 in FIG. 4, downstream of the first portion CH1 conveying the lubricant in the passage 65 of each connection tube 60, a radial orifice 66 is provided in the lateral wall of the tube, close to its closed bottom 64, and a radial orifice 67 in correspondence in the movable annular rod 31 of the actuator, from the outside thereof, in order to open into the passage hole 62.1 for receiving the end 64 of the anti-rotation connection tube.

These two orifices 66, 67, once the parts of the actuator are assembled, are in correspondence with each other, through a conventional positive-location mechanism (not shown) (for example a rib on the free end of the tube cooperating with a reception groove in the movable rod). Thus the orifices 66 and 67 are necessarily aligned.

After the first portion, the internal path continues through the second portion CH2, which is defined by an external annular chamber 70 created by a sleeve 71 for annular support of the inner ring 39 of the rolling bearing, said sleeve having been extended over the entire length of the sliding movable rod 31, as shown by FIG. 4. This sleeve 71 is slidably connected to the movable part or rod 31 of the actuator and, with the lateral wall 34, delimits the external annular chamber 70 in which the lubricant arrives. Static sealing is effected between the sleeve and the rod in order to seal the chamber vis-à-vis the outside.

Finally, by providing a plurality of orifices 69 (at least one) distributed around the support sleeve 71 and opposite the orifices 54 of the inner ring 39, the lubricant passing through the annular chamber 70 passes through the orifices 69 and 54 in order to lubricate the inside of the rolling bearing 27. It should be noted that the orifices are here provided between the two rows of balls. Naturally, the inner ring 39, the sleeve 71 and the movable part 31 of the actuator are interconnected in rotation.

This second portion CH2 makes it possible to "discharge" the lubricant issuing from the first portion CH1 out of the actuator 25 in order to bring it into the rolling bearing 27 while remaining rigidly connected to the rod or movable part 31 of the actuator.

As shown by FIG. 5, the seal on the first portion CH1 preventing the return of the oil between the pipe and the tube is in particular obtained by a seal 72 provided around the free end 50.2 of the pipe 50 and cooperating with the internal surface 73 of the wall of the anti-rotation connection tube 60, delimiting the passage 65. (The same sealing by means of the seal 72 is provided between the pipes 50 and the conduits 52 in the previous embodiment in order to prevent the return of the oil.) However, if leaks are judged to be acceptable, seals between the pipes and the tubes can be dispensed with. The external surface 74 of the tube 60 and the internal surface of the hole 61 in the piston are equipped with seals 76 to guarantee sealing between the two chambers 35, 36. This sealing is supplemented by seals 77 provided at the outer periphery of the piston 33 with the internal surface 78 of the lateral wall 34 of the actuator.

The lubrication means 29 disclosed here under the two solutions in FIGS. 2 and 4 thus makes it possible to transfer oil issuing from the pipes connected to a fixed reference frame (casing) as far as "buffer" chambers (conduits or tubes and annular chamber) located in the movable reference frame of the actuator. Consequently, it affords numerous advantages such as in particular direct supply by the inner ring of the rolling bearing and therefore optimum and homogeneous lubrication thereof whatever the position of the actuator, the absence of any problem in positioning the rolling bearing with respect to the supply source independent of that of the actuator, the absence of disturbance to the system for orientation of the pitch of the propeller by the independent source, and partial integration in the actuator with reduced space requirements as a result.

Without departing from the scope of the invention, such a bearing having lubrication means may of course be mounted on any support able to move in translation (shaft, spindle, etc.) other than the movable part of a linear actuator.

The invention claimed is:

1. An assembly comprising:
a bearing including an inner ring;
a linear-movement actuator including
a cylindrical fixed part including a fixed piston, and
a movable external rod which is disposed around the cylindrical fixed part and which moves in translation by sliding about the fixed piston, the movable external rod including a lateral wall which delimits two opposing variable-volume chambers opposite each other, and the inner ring of the bearing being mounted around the movable external rod;
a pipe for conveying a lubricant from a lubricant supply source; and
a conduit connected to the movable external rod, in which engages, at least in part, the conduit having an internal path for conveying the lubricant from the movable external rod to the bearing, and passing the lubricant through the inner ring of the bearing,
wherein the pipe and the conduit extend parallel to the translational movement of the movable external rod to cooperate with each other by sliding between first and second positions of the moveable external rod, the pipe being fixed and the conduit sliding with respect thereto.

2. The assembly according to claim 1, wherein the conduit is provided in a lateral wall of the movable external rod, and wherein the internal path comprises at least one hole made in the inner ring of the bearing and in communication with the conduit.

3. The assembly according to claim 2, wherein the pipe comprises a plurality of pipes distributed angularly with respect to one another and communicating, on an upstream side, with a common element comprising a common conduit, for conveying the lubricant, connected to the lubricant supply source, and wherein said conduit comprises a plurality of conduits, and said pipes engaging, on a downstream side, in respective conduits provided in correspondence in a wall of the movable external rod.

4. The assembly according to claim 1, wherein the movable external rod and the cylindrical fixed part of the linear-movement actuator are interconnected in rotation by a connection tube supported by transverse end faces of the movable external rod and associated with the cylindrical fixed part, the connection tube including an internal passage forming the conduit configured to receive the pipe conveying the lubricant.

5. The assembly according to claim 4, wherein the internal passage comprises first and second portions, the first portion for conveying the lubricant through the internal passage in the movable external rod of the linear-movement actuator, and the second portion for conveying the lubricant from the internal passage to the bearing.

6. The assembly according to claim 5, wherein the second portion is defined by orifices formed in correspondence in the connection tube and a relevant transverse face of the movable external rod, and by an annular chamber formed between the lateral wall of the movable external rod and a sleeve for annular support of the inner ring of the bearing, and communicating with the orifices and the inner ring of the bearing.

7. A system for changing a pitch of vanes of a turboshaft engine propeller having a longitudinal axis for an aircraft, comprising:
    an assembly according to claim 1; and
    a connection mechanism for transforming translation of the movable external rod of the linear-movement actuator into a rotation of the vanes to modify a pitch thereof, and a means of transmission between the outer ring of the bearing and the vanes.

8. A turbine engine comprising:
    coaxial and contrarotatory propulsion propellers, upstream and downstream respectively,
    wherein at least the upstream propeller comprises a system for changing the pitch of the vanes according to claim 7.

* * * * *